(12) United States Patent
Ito

(10) Patent No.: US 10,882,496 B2
(45) Date of Patent: Jan. 5, 2021

(54) IMAGING APPARATUS AND VEHICLE

(71) Applicant: KYOCERA Corporation, Kyoto (JP)

(72) Inventor: Mitsuru Ito, Sagamihara (JP)

(73) Assignee: KYOCERA Corporation, Kyoto (JP)

( * ) Notice: Subject to any disclaimer, the term of this patent is extended or adjusted under 35 U.S.C. 154(b) by 224 days.

(21) Appl. No.: 16/064,888

(22) PCT Filed: Dec. 12, 2016

(86) PCT No.: PCT/JP2016/086928
§ 371 (c)(1),
(2) Date: Jun. 21, 2018

(87) PCT Pub. No.: WO2017/110562
PCT Pub. Date: Jun. 29, 2017

(65) Prior Publication Data
US 2019/0001932 A1 Jan. 3, 2019

(30) Foreign Application Priority Data

Dec. 24, 2015 (JP) .................. 2015-252618

(51) Int. Cl.
*B60S 1/56* (2006.01)
*G02B 1/18* (2015.01)
(Continued)

(52) U.S. Cl.
CPC ............... *B60S 1/56* (2013.01); *B01J 35/004* (2013.01); *B60R 1/00* (2013.01); *B60S 1/60* (2013.01);
(Continued)

(58) Field of Classification Search
CPC ...... G02B 27/0006; G02B 1/18; G02B 1/105;
G02B 1/14; G02B 1/04; G02B 1/11;
G02B 1/10; G02B 1/115; G02B 7/021;
G02B 1/118; G02B 1/16; G02B 21/33;
G02B 23/16; G02B 27/00; G02B 5/08;
G02B 5/3033; G02B 13/003; G02B
13/0085; G02B 13/16; G02B 17/08;
G02B 1/111; G02B 1/113; G02B
2027/0178; G02B 21/248; G02B
2207/101; G02B 2207/107; G02B 23/18;
G02B 23/22; G02B 26/0833;
(Continued)

(56) References Cited

U.S. PATENT DOCUMENTS

2006/0062570 A1* 3/2006 Kikuchi ................. G03B 17/02
396/439

FOREIGN PATENT DOCUMENTS

JP    H10-250532 A    9/1998
JP    H11-308505 A    11/1999
(Continued)

*Primary Examiner* — Collin X Beatty
*Assistant Examiner* — Grant A Gagnon
(74) *Attorney, Agent, or Firm* — Procopio Cory Hargreaves and Savitch LLP

(57) ABSTRACT

An imaging apparatus includes an optical member, a housing, and a light source. The optical member contains a photocatalyst film on an object-side surface. The housing contains an accommodation section in which the optical member is accommodated. The light source is located in an internal space of the housing and emits light to activate the photocatalyst film. The light from the light source passes through the optical member and irradiates the photocatalyst film.

12 Claims, 4 Drawing Sheets

(51) Int. Cl.
  *H04N 5/217* (2011.01)
  *B60R 1/00* (2006.01)
  *B60S 1/60* (2006.01)
  *G03B 17/08* (2006.01)
  *B01J 35/00* (2006.01)

(52) U.S. Cl.
  CPC .............. *G02B 1/18* (2015.01); *G03B 17/08* (2013.01); *H04N 5/2171* (2013.01)

(58) Field of Classification Search
  CPC .............. G02B 26/127; G02B 27/0037; G02B 27/0075; G02B 27/01; G02B 27/017; G02B 27/0172; G02B 27/0176; G02B 27/0189; G02B 27/46; G02B 3/00; G02B 3/0068; G02B 5/005; G02B 5/02; G02B 5/0808; G02B 5/1809; G02B 5/1895; G02B 5/285; G02B 6/0035; G02B 6/0051; G02B 6/4226; G02B 6/4228; G02B 6/4244; G02B 6/4251; G02B 7/04; G02B 7/08; G02B 7/14; H04N 5/2171; H04N 5/2254; H04N 5/2253; H04N 5/2251; H04N 5/2257; H04N 2101/00; H04N 5/23212; H04N 5/335; H04N 5/357; H04N 5/64; H04N 5/65; G03B 17/02; G03B 11/00; G03B 17/08; G03B 17/14; G03B 19/12; G03B 21/14; G03B 2205/0061; G03B 11/043; G03B 17/12; G03B 17/18; G03B 17/28; G03B 21/145; G03B 21/2066; G03B 21/28; G03B 2205/0084; G03B 2205/0092; G03B 2217/002; G03B 33/08; G03B 9/10; B60R 1/06; B60R 1/0602; B60R 11/04; B60R 1/00; B60R 1/04; B60R 1/08; B60R 2001/1253; B60R 2011/004; B60R 2300/802; B60R 2300/8026; B60R 2300/8053; B01J 19/123; B01J 2219/00252; B01J 2219/0892; B60S 1/56
  USPC ........................................................ 359/507
  See application file for complete search history.

(56) References Cited

FOREIGN PATENT DOCUMENTS

| | | |
|---|---|---|
| JP | 2000-50121 A | 2/2000 |
| JP | 2002-72324 A | 3/2002 |
| JP | 2004-198288 A | 7/2004 |
| JP | 2014-215418 A | 11/2014 |
| WO | 2015/194200 A1 | 12/2015 |

\* cited by examiner

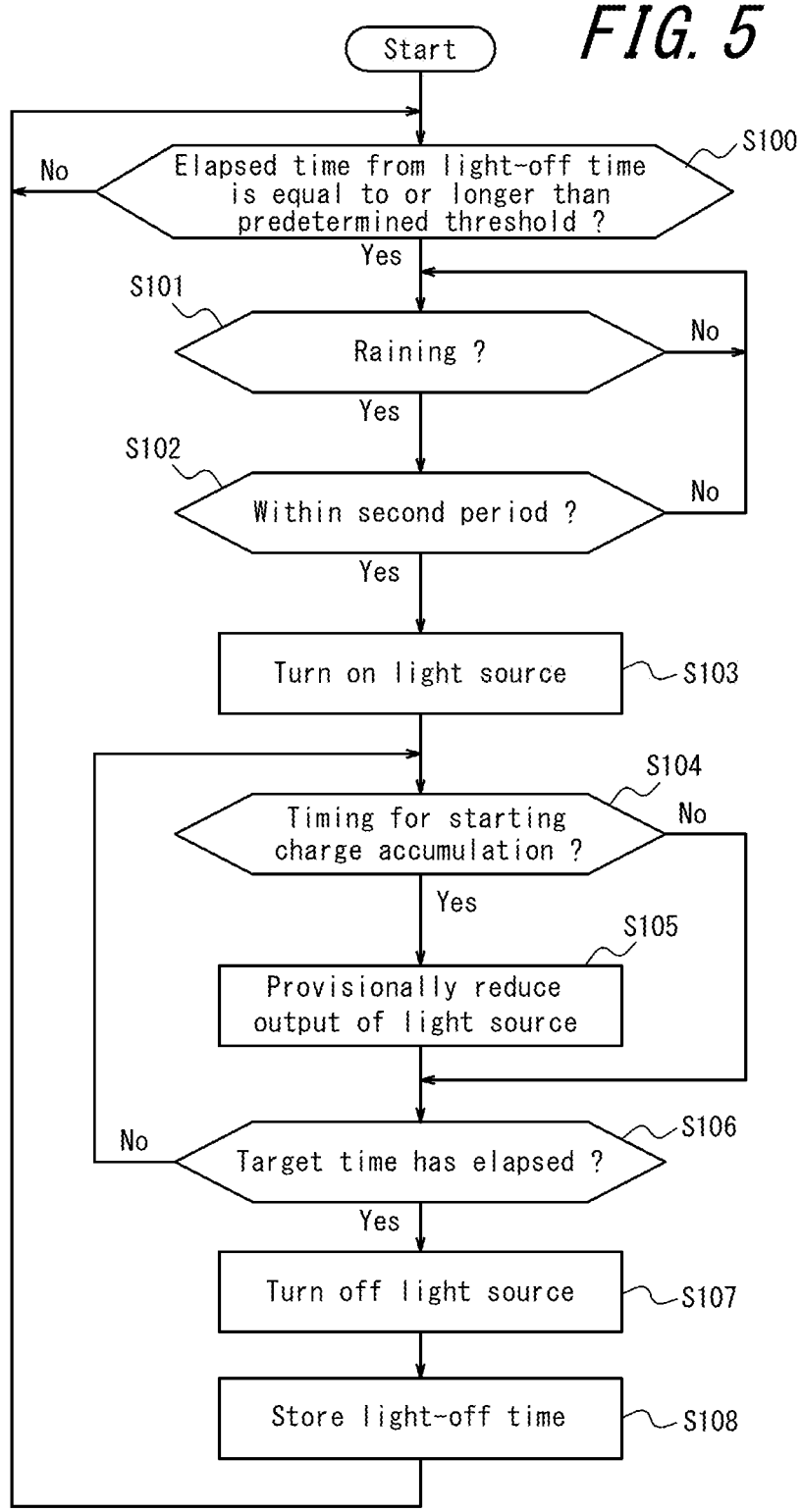

IMAGING APPARATUS AND VEHICLE

CROSS REFERENCE TO RELATED APPLICATION

This application claims priority to and the benefit of Japanese Patent Application No. 2015-252618 filed on Dec. 24, 2015, the entire contents of which are incorporated herein by reference.

TECHNICAL FIELD

The present disclosure relates to an imaging apparatus and a vehicle.

BACKGROUND

A photocatalyst film such as a titanium oxide film is known to be activated and to demonstrate a super-hydrophilic property when irradiated with light of a particular wavelength (e.g. ultraviolet light).

SUMMARY

An imaging apparatus according to an embodiment of the present disclosure includes an optical member, a housing, and a light source. The optical member contains a photocatalyst film on an object-side surface. The housing contains an accommodation section in which the optical member is accommodated. The light source is located in an internal space of the housing and emits light to activate the photocatalyst film. The light from the light source passes through the optical member and irradiates the photocatalyst film.

A vehicle according to an embodiment of the present disclosure includes an imaging apparatus that includes an optical member, a housing, and a light source. The optical member contains a photocatalyst film on an object-side surface. The housing contains an accommodation section in which the optical member is accommodated. The light source is located in an internal space of the housing and emits light to activate the photocatalyst film. The light from the light source passes through the optical member and irradiates the photocatalyst film.

BRIEF DESCRIPTION OF THE DRAWINGS

In the accompanying drawings:

FIG. 5 is a flowchart illustrating operation of a controller.

DETAILED DESCRIPTION

Hereinafter, embodiments of the present disclosure will be described with reference to the accompanying drawings.

Figure 1:
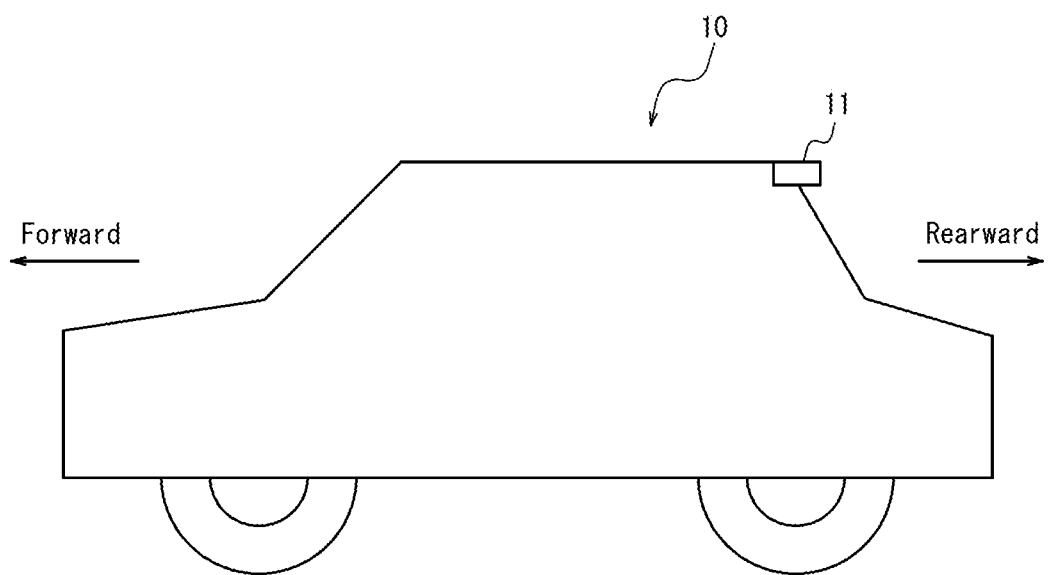
FIG. 1 is a diagram illustrating a vehicle having an imaging apparatus according to an embodiment of the present disclosure, viewed from a left side.

Referring to FIG. 1, a vehicle 10 according to the embodiment of the present disclosure will be described. The vehicle 10 is, for example, an automobile. The vehicle 10 travels in accordance with operation by a driver of the vehicle 10. One or more imaging apparatuses 11 are provided on an exterior of the vehicle 10. An imaging apparatus 11 is arranged, for example, in a rear portion of the vehicle 10 in such a manner as to be able to capture an area behind the vehicle 10. The number and arrangement of the imaging apparatuses 11 provided to the vehicle 10 may be appropriately determined.

Figure 2:
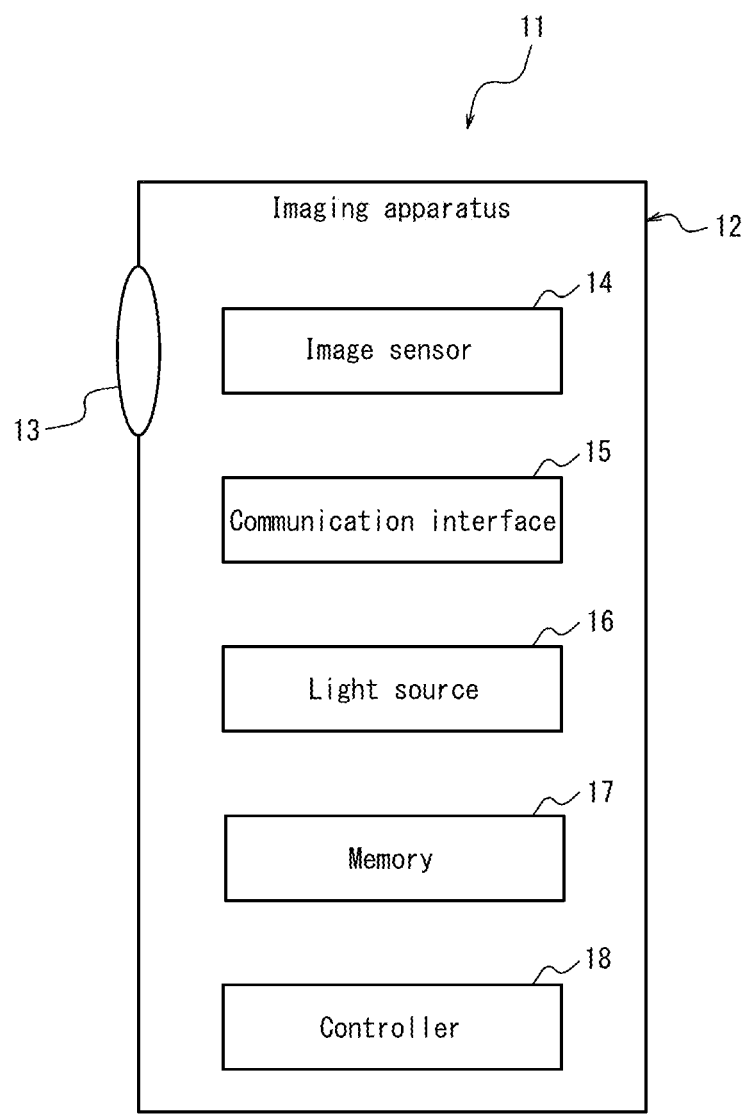
FIG. 2 is a block diagram schematically illustrating a configuration of the imaging apparatus.

Referring to FIG. 2, a function of each constituent element of the imaging apparatus 11 will be described. The imaging apparatus 11 includes a housing 12, an imaging optical system 13, an image sensor 14, a communication interface 15, a light source 16, a memory 17, and a controller 18. The imaging optical system 13 will also be referred to as an optical member.

The housing 12 is made from, for example, a resin material or a metal material. The housing 12 accommodates some constituent elements of the imaging apparatus 11.

The imaging optical system 13 includes, for example, an aperture and one or more lenses. The imaging optical system 13 forms a subject image. Hereinafter, the imaging optical system 13 will be assumed to be a single lens. An object-side surface of the imaging optical system 13 is at least partially covered with a photocatalyst film. The object-side surface of the imaging optical system 13 will also be referred to as a first surface. The first surface of the imaging optical system 13 is arranged in such a manner that at least a portion of the first surface is exposed to the outside of the housing 12, as will be described below.

The photocatalyst film is activated when irradiated with light in a wavelength band corresponding to a contained component. When activated, the photocatalyst film exerts a particular effect on its formation surface. The photocatalyst film contains, for example, titanium dioxide ($TiO_2$). When irradiated with ultraviolet light, the formation surface of the photocatalyst film may demonstrate a super-hydrophilic property. For example, at least a portion of the object-side surface of the imaging optical system 13 covered with the photocatalyst film may demonstrate the super-hydrophilic property. In particular, in order to cause the titanium dioxide with an anatase structure to demonstrate the super-hydrophilic property, ultraviolet light with a dominant wavelength of 387.5 nm or less may be used. In order to cause the titanium dioxide with a rutile structure to demonstrate the super-hydrophilic property, ultraviolet light with a dominant wavelength of 412 nm or less may be used. To cause photocatalysis, a wavelength band of light for activating the photocatalyst film may be determined depending on, for example, doping of another material other than titanium dioxide.

In general, the longer the ultraviolet light is irradiated, the smaller a contact angle of a water droplet on the formation surface of the photocatalytic film becomes, thus demonstrating the super-hydrophilic property. On the other hand, as the elapsed time after the irradiation of the ultraviolet light has stopped increases, the contact angle of the water droplet on the formation surface of the photocatalyst film gradually increases, thus losing the super-hydrophilic property. After the loss of the super-hydrophilic property due to stopping of the irradiation of the ultraviolet light, the super-hydrophilic property may be demonstrated again when irradiated with the ultraviolet light. The demonstration of the super-hydrophilic property realizes, for example, a self-cleaning function which causes water droplets to wash away dirt on the object-side surface of the imaging optical system 13 and dirt removal caused by decomposition of an organic material.

A position and an orientation of the imaging apparatus 11 provided to the vehicle 10 is determined depending on a usage of the imaging apparatus 11. In some positions and orientations, the imaging optical system 13 of the imaging apparatus 11 is not sufficiently irradiated with natural light such as sunlight. The natural light such as the sunlight does not necessarily irradiate an amount of ultraviolet light sufficient to activate the photocatalyst film formed on the imaging optical system 13 of the imaging apparatus 11 provided to the vehicle 10. The photocatalyst film is activated primarily by light from the light source 16 to demonstrate the super-hydrophilic property.

The image sensor 14 is, for example, a CCD (Charge Coupled Device) image sensor or a CMOS (Complementary Metal Oxide Semiconductor) image sensor. The image sensor 14 generates a captured image by performing photoelectric conversion of light formed by the imaging optical system 13. When the image sensor 14 is a CMOS image sensor, the image sensor 14 may perform a predetermined upstream image processing on the captured image, in place of the controller 18 as will be described later. For example, the image sensor 14 is sensitive to the light in the ultraviolet band in addition to the visible light band. The image sensor 14 having sensitivity to light of a desired wavelength band may be employed, depending on a function and a purpose of the imaging apparatus 11.

The communication interface 15 is an interface for communicating via a network. The network may include, for example, a wired network, a wireless network, or a CAN (Controller Area Network).

The light source 16 is, for example, an LED (Light Emitting Diode). The light source 16 is capable of emitting the light in the wavelength band that activates the photocatalyst film formed on the imaging optical system 13. The light emitted by the light source 16 is, for example, ultraviolet light. The light emitted by the light source 16 may be in a wavelength band corresponding to the photocatalyst film. The light source 16 is arranged inside the housing 12 in such a manner that the light emitted from the light source 16 passes through the imaging optical system 13 and is irradiated to the photocatalyst film. In particular, the light from the light source 16 enters an outer peripheral side surface or an image-side surface of the imaging optical system 13 and passes through the imaging optical system 13, as will be described later. The image-side surface of the imaging optical system 13 will also be referred to as a second surface.

The memory 17 is, for example, a storage device. The storage device may be configured with, for example, a semiconductor memory, a magnetic memory, or an optical memory. The memory 17 stores various information and programs necessary for operation of the imaging apparatus 11. The memory 17 stores, for example, a light-off time indicating a previous time when the light source 16 was turned off.

The controller 18 includes, for example, a specialized processor dedicated to image processing or a general-purpose processor configured to load a specific program and to execute a specific function. The specialized processor dedicated to image processing includes, for example, a DSP (Digital Signal Processor). The controller 18 performs various image processing on the captured image generated by the image sensor 14 and centrally controls the imaging apparatus 11. For example, the controller 18 controls operation of the communication interface 15 to perform communication via the network.

The controller 18 controls operation of the image sensor 14 to control a timing for starting charge accumulation by photoelectric conversion. The controller 18 causes the image sensor 14 to capture a subject periodically, e.g., at 60 fps.

Hereinafter, a first period refers to a charge accumulation period in which the image sensor 14 performs charge accumulation by photoelectric conversion, and a second period refers to a period other than the first period. The period other than the first period is a period in which the image sensor 14 does not perform charge accumulation by photoelectric conversion.

The controller 18 performs the predetermined upstream image processing on the captured image generated by the image sensor 14. The upstream image processing includes, for example, CDS (Correlated Double Sampling), AGC (Automatic Gain Control), and A/D (Analog to Digital) conversion. The controller 18 performs predetermined downstream image processing on the captured image subjected to the upstream image processing. The downstream image processing includes, for example, white balancing, exposure adjustment, viewpoint conversion, and object recognition processing. The controller 18 may transmit the captured image subjected to the downstream image processing or various information generated by the predetermined downstream image processing to an external apparatus via the communication interface 15. The external apparatus includes, for example, an ECU (Engine Control Unit) or an automotive navigation system of the vehicle 10.

The controller 18 changes output of the light source 16 by controlling operation of the light source 16. As described above, when the light source 16 arranged inside the housing 12 is turned on, the light from the light source 16 passes through the imaging optical system 13 and irradiates the photocatalyst film. Thus, the photocatalyst film is activated.

Hereinafter, operation of the controller 18 for driving control of the light source 16 will be described in detail. Here, the light source 16 is assumed to be in an off-state.

The controller 18 determines whether an elapsed time from the light-off time stored in the memory 17 to a current time is equal to or longer than a predetermined threshold. The predetermined threshold corresponds to, for example, a time by which the super-hydrophilic property of the photocatalyst film is considered to have deteriorated by a certain extent (e.g., a contact angle between a surface of the catalyst film and the water droplet is 10 degrees) from a desired performance (e.g., the contact angle of 5 degrees). The desired performance may be performance acquired when the contact angle is approximately 5 degrees between the surface of the photocatalyst film and the water droplet. A state of deterioration by a certain extent from the desired performance may correspond to, for example, a state in which the contact angle is approximately 10 degrees. The predetermined threshold may be determined on the basis of experiments or simulations. When the light-off time is not stored in the memory 17 such as, for example, upon first operation of the imaging apparatus 11, the controller 18 may determine that the elapsed time is equal to or longer than the predetermined threshold.

When it is determined that the elapsed time is equal to or longer than the predetermined threshold, the controller 18 determines whether it is raining. For example, the controller 18 determines that it is raining when the controller 18 acquires a detection signal indicating that it is raining from a raindrop sensor provided to the vehicle 10, or when the controller 18 acquires vehicle information indicating that a wiper of the vehicle 10 is in operation from an external apparatus such as the ECU.

When it is determined that it is raining, the controller 18 determines whether the current time is within the second period.

When it is determined that the current time is not within the second period, the controller 18 keeps the light source 16 turned off. The determination that the current time is not within the second period may be synonymous with determination that the current time is within the first period.

When it is determined that the current time is within the second period, the controller 18 turns the light source 16 on. When the light source 16 is turned on, the light from the light source 16 passes through the imaging optical system 13 and irradiates the photocatalyst film.

The controller 18 determines whether a predetermined target time has elapsed after the light source 16 starts lighting. The target time is, for example, a light irradiation time necessary for the super-hydrophilic property of the photocatalyst film to regain the desired property after deteriorating by a certain extent. For example, as the elapsed time from the light-off time to the current time is longer, the controller 18 extends the target time. A correspondence between the elapsed time and the target time may be determined on the basis of, for example, experiments or simulations.

As will be described later, when, for example, the output of the light source 16 provisionally decreases throughout the charge accumulation period in which the image sensor 14 accumulates charge by performing photoelectric conversion, the controller 18 determines whether the target time has elapsed after the light source 16 starts lighting, except for the charge accumulation period in which the output of the light source 16 provisionally decreases. In particular, when 30 minutes has elapsed after the light source 16 is turned on during which there is the charge accumulation period for 1 minute in total, the controller 18 determines that the elapsed time after the light source 16 starts lighting is 29 minutes, i.e., 30 minutes minus 1 minute.

When it is determined that the target time has elapsed, the controller 18 turns the light source 16 off. The controller 18 stores the current time as the light-off time in the memory 17.

As described above, the controller 18 turns the light source 16 on when the elapsed time is equal to or longer than the predetermined threshold after the light source 16 is previously turned off and, simultaneously, it is determined that it is raining and the current time is within the second period. After turning the light source 16 on, the controller 18 turns the light source 16 off when the target time has elapsed after the light source 16 starts lighting. This configuration turns the light source 16 off when the photocatalytic film regains the desired performance of the super-hydrophilic property. Thus, as compared with, for example, a configuration in which the light source 16 is kept turned on at all times, power consumption and heat generation of the light source 16 is reduced, and the life of the light source 16 is prolonged.

While the light source 16 is lighting, the controller 18 determines whether the current time corresponds to a timing for starting the charge accumulation period. When it is determined that the current time corresponds to the timing for starting the charge accumulation period, the controller 18 provisionally reduces the output of the light source 16 to, for example, zero. In particular, the controller 18 reduces the output of the light source 16 throughout the charge accumulation period and restores original output of the light source 16 when the charge accumulation period ends. This configuration reduces the output of the light source 16 during the charge accumulation period of the image sensor 14. Thus, when the image sensor 14 is sensitive to the light from the light source 16, the influence of the light from the light source 16 on the captured image may be reduced.

Figure 3:
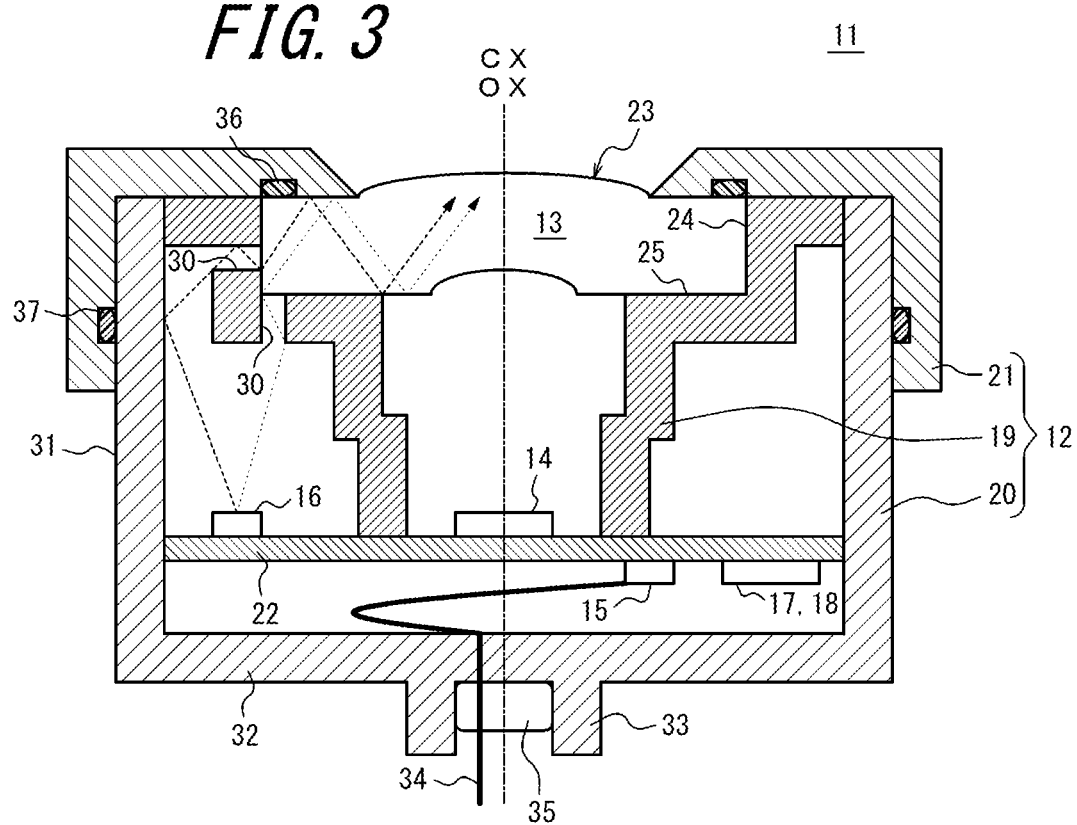
FIG. 3 is a cross-sectional diagram schematically illustrating the configuration of the imaging apparatus including a housing, taken along an optical axis.

Referring to FIG. 3, configurations of the constitution elements of the imaging apparatus 11 and positional relationships thereof will be described. The imaging apparatus 11 includes the imaging optical system 13, the housing 12 that includes a first member 19, a second member 20, and a pressing member 21, and a substrate 22 that has the image sensor 14, the communication interface 15, the light source 16, the memory 17, and the controller 18 mounted thereon.

In the imaging optical system 13, along an optical axis OX, a first direction is defined to be on the object side and a second direction is defined to be on the image side. As will be described later, the imaging optical system 13 is fixedly accommodated in the housing 12 in such a manner that the optical axis OX and a central axis CX of the housing 12 substantially coincide with each other. In a state in which the imaging optical system 13 is fixedly accommodated in the housing 12, the object-side surface of the imaging optical system 13 is exposed to the outside of the imaging apparatus 11. The photocatalyst film 23 is formed at least in a portion of the object-side surface of the imaging optical system 13 exposed to the outside.

The housing 12 includes the first member 19 accommodating the imaging optical system 13, the second member 20 accommodating the substrate 22, and the pressing member 21 fixing the imaging optical system 13. The first member 19 and the second member 20 each have an approximate cylindrical shape along the central axis CX. The imaging apparatus 11 is assembled by, for example, arranging the substrate 22 in the second member 20, inserting the first member 19 into a radially inner side of the second member 20, arranging the imaging optical system 13 in the first member 19, and then fixing the imaging optical system 13 with the pressing member 21.

At an object-side end portion of the first member 19, an accommodation section accommodating the imaging optical system 13 in a radially inner side thereof is provided. The accommodation section is defined by an accommodation-side surface 24 in the object-side end portion of the first member 19 and a bearing surface 25 extending toward the radial center from the accommodation-side surface 24. In a state in which the imaging optical system 13 is accommodated in the accommodation section, the accommodation-side surface 24 is in contact with at least a portion of the outer peripheral side surface of the imaging optical system 13. The bearing surface 25 is in contact with at least a portion of the image-side surface (the second surface) of the imaging optical system 13. The accommodation-side surface 24 defines a position of the imaging optical system 13 accommodated in the accommodation section with respect to the first member 19 in a direction perpendicular to the central axis CX. The bearing surface 25, together with the pressing member 21 as will be described later, defines a position of the imaging optical system 13 accommodated in the accommodation section with respect to the central axis CX. For example, when the imaging optical system 13 is accommodated in the accommodation section, the optical axis OX and the central axis CX substantially coincide with each other.

Figure 4:
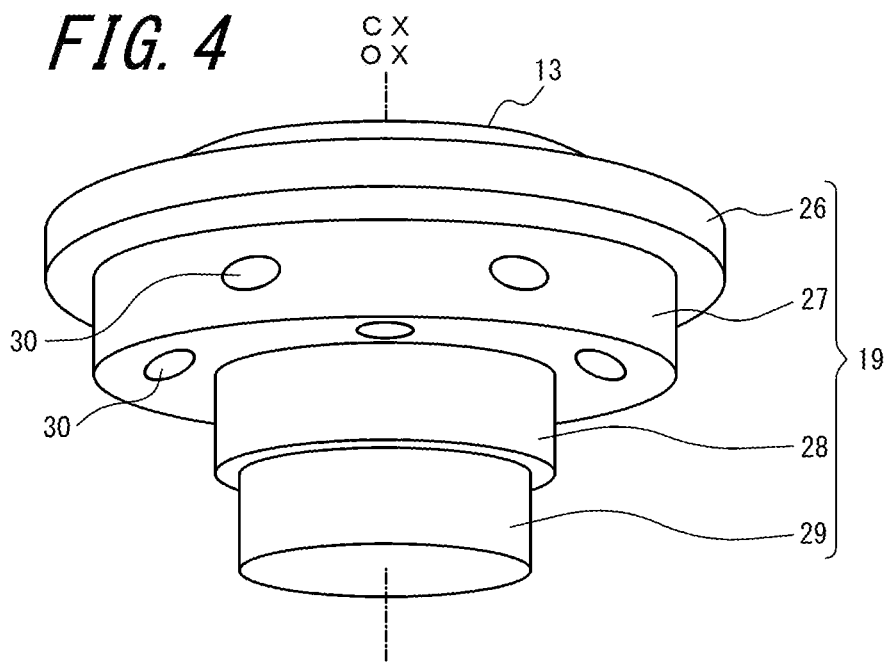
FIG. 4 is a perspective view illustrating a first portion of the housing.

As illustrated in FIG. 4 by way of example, the first member 19 includes at least two cylindrical portions with different outer diameters extending along the central axis CX. For example, the first member 19 includes a first outer diameter portion 26, a second outer diameter portion 27, a third outer diameter portion 28, and a fourth outer diameter portion 29, that are arranged from the object side toward the image side in a descending order of a diameter. An outer diameter of the first outer diameter portion 26, which is the largest of all, is approximately equal to an inner diameter of the second member 20, as illustrated in FIG. 3 by way of example. When the first member 19 is inserted into the radially inner side of the second member 20, the first outer diameter portion 26 of the first member 19 fits in the radially inner side of the second member 20.

The first member 19 includes at least one through hole 30 extending from an outer peripheral surface of the first member 19 other than an outer peripheral side surface of the first outer diameter portion 26 to the accommodation section. For example, a plurality of through holes 30 are formed in a circumferential direction with respect to the central axis CX. In FIG. 4 by way of example, a plurality of through holes 30 are formed on each of an outer peripheral side surface and an object-side surface of the second outer diameter portion 27. In a state in which the imaging apparatus 11 is assembled, the through holes 30 extend from the internal space of the housing 12 to the accommodation section. As will be described later, the light from the light source 16 arranged on the substrate 22 accommodated in the second member 20 passes through the through holes 30 and reaches at least one of the outer peripheral side surface or the image-side surface of the imaging optical system 13. The light having reached the imaging optical system 13 enters the imaging optical system 13 and, for example, after repeating reflecting therein, the light is irradiated to the entire surface of the photocatalyst film 23.

As illustrated in FIG. 3, the second member 20 includes a side wall 31 having a cylindrical shape along the central axis CX, and a bottom wall 32 that is formed on an image-side end portion of the side wall 31 and closes an opening of the image-side end portion of the side wall 31.

The substrate 22 is fixedly accommodated on a radially inner side of the side wall 31. An inner diameter of the object-side end portion of the side wall 31 is substantially equal to the outer diameter of the first outer diameter portion 26 of the first member 19 described above. When the first member 19 is inserted into the second member 20, the first outer diameter portion 26 of the first member 19 is fitted in the side wall 31 of the second member 20. In a state in which the first member 19 is fitted in the second member 20, an image-side end surface of the first member 19 may be in contact with the substrate 22. This configuration can suppress the light from the light source 16 or the light that may enter the housing 12 via the through holes 30 from reaching the image sensor 14 from a gap between the first member 19 and the substrate 22.

The bottom wall 32 includes a projecting portion 33. The projecting portion 33 has, for example, a cylindrical shape along the central axis CX. The projecting portion 33 extends toward the outside of the housing 12. A through hole for passing a wiring 34, which will be described later, is formed on a radially inner side of the projecting portion 33. As will be described later, a first sealing member 35 provided to the wiring 34 is press-fitted on the radially inner side of the projecting portion 33. In the state in which the imaging apparatus 11 is assembled, the first sealing member 35 is press-fitted on the radially inner side of the projecting portion 33 and seals between the internal space of the imaging apparatus 11 and an external space.

The pressing member 21 is, for example, a retainer. The pressing member 21 is attached to the housing 12 in a state in which the imaging optical system 13 is accommodated in the accommodation section of the first member 19. The pressing member 21 attached to the housing 12 presses the imaging optical system 13 to the bearing surface 25 from the object side. By the pressure of the pressing member 21, the imaging optical system 13 is fixed to the housing 12.

The pressing member 21 includes a second sealing member 36 and a third sealing member 37. For example, each of the second sealing member 36 and the third sealing member 37 is an annular elastic member. The annular elastic member includes, for example, an O-ring.

The second sealing member 36 is arranged in an annular groove formed on a surface of the pressing member 21 in contact with the object-side surface of the imaging optical system 13. By the pressure of the pressing member 21, the second sealing member 36 is compressed in the direction along the central axis CX. The second sealing member 36 being compressed seals between the pressing member 21 and the object-side surface of the imaging optical system 13. The third sealing member 37 is arranged in a groove formed on a surface of the pressing member 21 in contact with an outer peripheral surface of the second member 20 of the housing 12. Between the pressing member 21 and the second member 20, the third sealing member 37 is compressed in the radial direction from the central axis CX. The third sealing member 37 being compressed seals between the pressing member 21 and the outer peripheral surface of the second member 20.

In the state in which the imaging apparatus 11 is assembled, the first sealing member 35, the second sealing member 36, and the third sealing member 37 seal between the internal space of the imaging apparatus 11 and the external space, as described above. This improves waterproof performance and dustproof performance of the imaging apparatus 11. For example, the first sealing member 35, the second sealing member 36, and the third sealing member 37 provided as described above realize the waterproof performance and the dustproof performance of the imaging apparatus 11. The number and shape of the sealing members, and positions of the sealing members with respect to the housing 12 may be appropriately determined depending on a shape and a configuration of the housing 12.

The substrate 22 is fixedly attached to the housing 12 inside the housing 12. The inside of the housing 12 will also be referred to as a radially inner side of the second member 20. The substrate 22 is provided with various hardware components. The various hardware components include, for example, the image sensor 14, the communication interface 15, the light source 16, the memory 17, and the controller 18.

In the state in which the imaging apparatus 11 is assembled, the image sensor 14 is positioned in the radially inner side of the first member 19. The light source 16 is positioned in a radially outer side of the first member 19. A first end of the wiring 34 is inserted into the housing 12 from outside via the through hole formed in the bottom wall 32 of the housing 12. The first end of the wiring 34 is coupled to the communication interface 15 via a connector and a flexible substrate. After the wiring 34 is coupled to the communication interface 15, the substrate 22 is arranged in the radially inner side of the second member 20.

When the light source 16 is turned on in the state in which the imaging apparatus 11 is assembled as described above, the light from the light source 16 passes through the through holes 30 formed in the first member 19 and enters the imaging optical system 13 as illustrated in FIG. 3 by way of example. In particular, a part of the light from the light source 16 directly reaches the through holes 30. Another part of the light from the light source 16 reflects on, for example, the outer peripheral surface of the first member 19 or the inner peripheral surface of the side wall 31 of the second member 20 within the housing 12 before reaching the through holes 30. The light having reached the through holes 30 passes through the through holes 30 and reaches at least one of the outer peripheral side surface or the image-side surface of the imaging optical system 13. After reaching the imaging optical system 13, the light enters the imaging optical system 13, is repeatedly reflected therein to irradiate the entire surface of the photocatalyst film 23.

At least a portion of the inner wall defining the internal space of the housing 12 includes a reflective portion having a reflectance to reflect the light from the light source 16 that is greater than a reflectance of the inner wall of the housing 12. The inner wall includes at least a portion of, for example, each of the outer peripheral surface of the first member 19 and the inner peripheral surface of the second member 20. For example, when the housing 12 is molded from a resin, the reflective portion may be formed from, for example, a metallic thin film. This configuration increases the amount of light from the light source 16 that reaches the through holes 30. Thus, the activation efficiency of the photocatalyst film 23 may be improved.

The imaging optical system 13, i.e., the lens having the photocatalyst film 23 formed thereon according to the present embodiment may be made of glass. When a lens made of glass is used, as compared with, for example, a lens made of plastic, deterioration of the material due to the light from the light source 16 is reduced.

Although in the above embodiment the optical axis OX and the central axis CX substantially coincide with each other, these axes may be otherwise provided. For example, there may be a case in which an effective diameter of the lens corresponds to a non-circular shape, or the housing 12 has an irregular shape with respect to the lens. Irregular shapes include, for example, shapes for which the housing 12 does not have a central axis. In this case, the optical axis OX and the central axis CX do not necessarily need to coincide with each other.

Although in the above embodiment the housing 12 includes the first member 19, second member 20, and the pressing member 21, the configuration of the housing 12 is not limited thereto. For example, at least two of the first member 19, second member 20, and the pressing member 21 may be integrally formed. For example, each of the first member 19, the second member 20, and the pressing member 21 may include a combination of a plurality of members.

Referring to FIG. 5, operation of the controller 18 which performs driving control of the light source 16 as described above will be described. At the start of this operation, it is assumed that the light source 16 is in the off-state.

Step S100: the controller 18 determines whether the elapsed time from the light-off time stored in the memory 17 to the current time is equal to or longer than the predetermined threshold. For example, when the light-off time is not stored in the memory 17 such as at the first operation of the imaging apparatus 11, the controller 18 may determine that the elapsed time is equal to or longer than the predetermined threshold. When the controller 18 determines that the elapsed time is equal to or longer than the predetermined threshold, the process proceeds to step S101. On the other hand, when the controller 18 determines that the elapsed time is shorter than the predetermined threshold, the process does not proceed from step S100 and waits until the elapsed time becomes equal to or longer than the predetermined threshold.

Step S101: when it is determined in step S100 that the elapsed time is equal to or longer than the predetermined threshold (in the case of Yes in step S100), the controller 18 determines whether it is raining. When it is determined that it is raining, the process proceeds to step S102. On the other hand, when it is determined that it is not raining, the process does not proceed from step S101 and waits until the controller 18 determines that it is raining.

Step S102: when it is determined in step S101 that it is raining (in the case of Yes in step S101), the controller 18 determines whether the current time is within the second period in which charge accumulation is not performed by the image sensor 14. When it is determined that the current time is within the second period, the process proceeds to step S103. When it is determined that the current time is not within the second period, the process returns to S101 and maintains the off-state of the light source 16.

Step S103: when it is determined in step S102 that the current time is within the second period (in the case of Yes in step S102), the controller 18 turns the light source 16 on.

Step S104: the controller 18 determines whether the current time corresponds to the timing for starting the charge accumulation period. When it is determined that the current time corresponds to the timing for starting the charge accumulation period, the process proceeds to step S105. On the other hand, when it is determined that the current time does not correspond to the timing for starting the charge accumulation period, the process proceeds to step S106.

Step S105: when it is determined in step S104 that the current time corresponds to the timing for starting the charge accumulation period (in the case of Yes in step S104), the controller 18 provisionally reduces the output of the light source 16 throughout the charge accumulation period.

Step S106: when it is determined that the current time does not correspond to the timing for starting the charge accumulation period (in the case of No in step S104), or after step S105, the controller 18 determines whether the predetermined target time has elapsed after the light source 16 starts lighting in step S103. When it is determined that the target time has elapsed, the process proceeds to step S107. On the other hand, when it is determined that the target time has not elapsed, the process returns to step S104.

Step S107: when it is determined in step S106 that the target time has elapsed (in the case of Yes in step S106), the controller 18 turns the light source 16 off.

Step S108: the controller 18 stores the current time as the light-off time in the memory 17. Then, the process returns to step S100.

As described above, in the imaging apparatus 11 according to embodiments of the present disclosure, the light from the light source 16 arranged inside the housing 12 passes through the imaging optical system 13 and irradiates the photocatalyst film 23. This configuration eliminates the necessity to, for example, arrange the light source 16 in front of the imaging apparatus 11 and thus reduces the probability that the light source 16 is captured in the captured image.

Recently, in addition to headlamps, various apparatuses having optical members are installed in vehicles such as automobiles. For example, in an imaging apparatus that includes an optical member, such as a lens or a cover glass, which is exposed to the outside, the photocatalytic film may be formed on the optical member. However, when the light source is arranged in front of the camera, the light source itself may be captured in a generated captured image and cause an adverse effect. The imaging apparatus 11 and the vehicle 10 according to the embodiment of the present disclosure may reduce the probability that the light source is captured in the captured image.

In particular, the through holes 30 formed extending from the internal space of the housing 12 to the housing unit enable the light from the light source 16 to pass through the through holes 30 and enter the imaging optical system 13.

The through holes 30 are formed in such a manner that at least a part of the light having entered the imaging optical system 13 reflects within the imaging optical system 13. This configuration enables the light having entered the imaging optical system 13 to repeatedly reflect within the imaging optical system 13 and to be irradiated to the entire surface of the photocatalyst film 23. Thus, the photocatalyst film 23 is evenly activated.

In the accommodation section of the first member 19, a plurality of through holes 30 are formed around the imaging optical system 13. For example, the plurality of through holes 30 are formed in the circumferential direction with respect to the optical axis OX of the imaging optical system 13. Thus, as compared with, for example, a configuration in which one through hole 30 is formed, this configuration facilitates the radiation of the light having entered the imaging optical system 13 to the entire surface of the photocatalyst film 23 and thus is capable of evenly activating the photocatalyst film 23. In the case where the lens effective diameter is not circular as described above, a plurality of through holes 30 formed around the imaging optical system 13 would achieve the same effect.

The reflection portion is formed in at least a portion of the inner wall defining the internal space of the housing 12. This configuration increases the amount of light from the light source 16 that reaches the through holes 30 and thus is capable of improving the activation efficiency of the photocatalyst film 23.

The controller 18 turns on the light source 16 throughout the target time when the light source 16 is in the off-state and, simultaneously, the elapsed time from the light-off time to turn off the light source 16 to the current time is equal to or longer than the predetermined threshold. Thus, the light source 16 is turned on when, for example, the super-hydrophilic property of the photocatalyst film 23 deteriorates to a certain extent from the desired performance, and is turned off when the desired performance is restored. Accordingly, as compared with, for example, a configuration to keep the light source 16 turned on at all times, the power consumption and the generated power of the light source 16 are reduced, and the life of the light source 16 is prolonged.

As the elapsed time from the light-off time to the current time is longer, the target time is extended. Thus, even when the super-hydrophilic property significantly deteriorates, the light from the light source 16 may be irradiated until, for example, the desired performance is restored. Accordingly, the probability to be able to acquire the desired performance is increased.

The controller 18 reduces the output of the light source 16 during the first period in which the image sensor 14 performs photoelectric conversion. This configuration enables reduction in the influence of the light from the light source 16 on the captured image when the image sensor 14 is sensitive to the light (e.g., ultraviolet light) of the light source 16.

Although the present disclosure has been described based on figures and embodiments, it is to be understood that a number of modifications and variations may be implemented by those who are ordinarily skilled in the art. Accordingly, such modifications and variations are included in the scope of the present disclosure. For example, a function of each means or each step may be rearranged, avoiding logical inconsistency, such that a plurality of means or steps are combined or subdivided.

For example, although in the above embodiment the imaging optical system 13 is a lens, the imaging optical system 13 is not limited thereto but may be an optical member, such as a cover glass.

The imaging apparatus 11 may measure the output of the light source 16 and, on the basis of a measured output, adjust the target time to turn the light source 16 on.

For example, the imaging apparatus 11 may further include a measurement unit capable of measuring power consumption per unit time during the period in which the light source 16 is turned on. The measurement unit includes, for example, a power meter. The controller 18 extends the target time when measured power consumption is smaller than a predetermined reference value. This configuration may reduce the influence of the decrease in the intensity of the light by extending the time to irradiate the light, when the intensity of the light from the light source 16 decreases due to, for example, aging.

Alternatively, the imaging apparatus 11 may further include an element capable of measuring light output of the light source 16. The light output of the light source 16 includes the intensity of the light from the light source 16. The element capable of measuring the light output includes, for example, a photodiode. The controller 18 extends the target time when measured light output is smaller than a predetermined reference value. This configuration, similarly to the above configuration, enables a reduction in the influence of the decrease in the light output. Instead of adding the element capable of measuring the intensity of the light from the light source 16, the image sensor 14 may be used in place of the element. This configuration enables the reduction in the influence of the decrease in the light output, without adding another constituent element.

The invention claimed is:

1. An imaging apparatus comprising:
   a lens comprising a photocatalyst film on an object-side surface that is opposite an image-side surface with respect to an optical axis, wherein the lens allows visible light to travel along the optical axis between the object-side surface and the image-side surface;
   a housing containing an accommodation section in which the lens is accommodated; and
   a light source that is located in an internal space of the housing and emits light to activate the photocatalyst film,
   wherein the housing has one or more through holes configured to guide the light from the light source such that the light passes through the lens, between the object-side surface and the image-side surface, to irradiate the photocatalyst film.

2. The imaging apparatus according to claim 1, wherein the housing includes, on at least a part of an inner wall defining the internal space, a reflecting portion having a reflectance with respect to the light from the light source greater than a reflectance of the inner wall.

3. The imaging apparatus according to claim 1, further comprising a measurement unit capable of measuring output of the light source.

4. A vehicle comprising the imaging apparatus of claim 1.

5. The imaging apparatus according to claim 1, wherein the one or more through holes extend from the internal space of the housing to the accommodation section, and the light from the light source passes through the one or more through holes and is incident upon the lens.

6. The imaging apparatus according to claim 5, wherein the light from the light source passes through the one or more through holes and is incident upon the lens from at least one of an outer side surface or the object-side surface of the lens.

7. The imaging apparatus according to claim 5, wherein at least a part of the light which passes through the one or more through holes and is incident upon the lens is reflected internally in the lens.

8. The imaging apparatus according to claim 5, wherein the one or more through holes include a plurality of through holes located around the lens.

9. The imaging apparatus according to claim 1, further comprising a memory and a controller, wherein the controller stores, in the memory, a light-off time at which the light source was turned off, and turns the light source on over a predetermined target time period when, while the light source is turned off, an elapsed time from the light-off time to a current time is equal to or longer than a predetermined threshold.

10. The imaging apparatus according to claim 9, as the elapsed time from the light-off time to the current time is longer, the controller lengthens the target time period over which the light source is turned on.

11. The imaging apparatus according to claim 9, further comprising an image sensor for performing photoelectric conversion of the visible light which has passed to an image side from an object side of the lens, wherein the controller reduces output of the light source in a first period in which the image sensor performs the photoelectric conversion.

12. The imaging apparatus according to claim 11, wherein the image sensor measures the output of the light source by performing the photoelectric conversion of the light from the light source.

* * * * *